(12) United States Patent
Lepper et al.

(10) Patent No.: US 9,475,525 B2
(45) Date of Patent: Oct. 25, 2016

(54) ARCUATE CLIP ASSEMBLY

(71) Applicant: ILLINOIS TOOL WORKS INC., Glenview, IL (US)

(72) Inventors: Mark O. Lepper, Oak Park, IL (US); David W. Edland, Chippewa Falls, WI (US); George Siragusa, Chicago Heights, IL (US); Gregory Flynn, Lake Orion, MI (US); Jeffrey Steltz, Chippewa Falls, WI (US); Timothy D. Pearson, New Lenox, IL (US); Wes Sprague, Bourbonnais, IL (US)

(73) Assignee: Illinois Tool Works Inc., Glenview, IL (US)

( * ) Notice: Subject to any disclaimer, the term of this patent is extended or adjusted under 35 U.S.C. 154(b) by 169 days.

(21) Appl. No.: 14/391,173

(22) PCT Filed: Apr. 5, 2013

(86) PCT No.: PCT/US2013/035362
§ 371 (c)(1),
(2) Date: Oct. 8, 2014

(87) PCT Pub. No.: WO2013/154920
PCT Pub. Date: Oct. 17, 2013

(65) Prior Publication Data
US 2015/0050071 A1    Feb. 19, 2015

Related U.S. Application Data

(60) Provisional application No. 61/621,732, filed on Apr. 9, 2012.

(51) Int. Cl.
*B62D 27/06*    (2006.01)
*B60Q 1/04*    (2006.01)
(Continued)

(52) U.S. Cl.
CPC .............. *B62D 27/06* (2013.01); *B60Q 1/0483* (2013.01); *B60Q 1/06* (2013.01); *B60Q 1/2615* (2013.01);
(Continued)

(58) Field of Classification Search
CPC ..... B62D 27/06; B62D 24/00; F16B 5/0614; F16B 5/0216; F16B 5/065; F16B 21/075; B60Q 1/06; B60Q 1/2615; B60Q 1/0483; Y10T 403/32606
See application file for complete search history.

(56) References Cited

U.S. PATENT DOCUMENTS 3,213,506 A * 10/1965 Fernberg ............. B60R 13/0206
24/289
3,249,973 A * 5/1966 Seckerson ........... B60R 13/0206
24/297
(Continued)

FOREIGN PATENT DOCUMENTS

| CN | 2449042 Y | 9/2001 |
|---|---|---|
| CN | 101410664 A | 4/2009 |
| JP | 2002053073 A | 2/2002 |

OTHER PUBLICATIONS

ISR and WO for PCT/US2013/035362 mailed Jul. 25, 2013.

*Primary Examiner* — James Ference
(74) *Attorney, Agent, or Firm* — Joseph M. Butscher; The Small Patent Law Group, LLC (57) ABSTRACT

A clip assembly is configured to securely connect a first structural component to a second structural component. The clip assembly may include an arc attachment member and an arc-receiving member. The arc attachment member may include a securing arc having a semi-circular rim. The arc attachment member is configured to be secured to one of the first or second structural components. The arc-receiving member may include an arc-receiving portion configured to receive the securing arc through multiple directions. The arc-receiving member is configured to be secured to the other of the first or second structural components. The securing arc is configured to be pivotally adjusted with respect to the arc-receiving portion.

20 Claims, 9 Drawing Sheets

(51) Int. Cl.
*F16B 5/02* (2006.01)
*F16B 5/06* (2006.01)
*F16B 21/07* (2006.01)
*B60Q 1/06* (2006.01)
*B60Q 1/26* (2006.01)
*B62D 24/00* (2006.01)

(52) U.S. Cl.
CPC .............. *B62D 24/00* (2013.01); *F16B 5/0216* (2013.01); *F16B 5/065* (2013.01); *F16B 5/0614* (2013.01); *F16B 21/075* (2013.01); *Y10T 403/32606* (2015.01)

(56) References Cited

U.S. PATENT DOCUMENTS

| | | | | |
|---|---|---|---|---|
| 3,550,217 A * | 12/1970 | Collyer | ................ | F16B 5/0642 411/508 |
| 3,577,603 A * | 5/1971 | Seckerson | ............... | F16B 21/06 411/510 |
| 3,745,612 A * | 7/1973 | Seckerson | ............. | F16B 21/086 411/508 |
| 4,778,320 A * | 10/1988 | Nakama | ................. | F16B 5/065 24/297 |
| 4,880,191 A * | 11/1989 | Lake, Jr. | ................ | F16M 11/12 248/222.12 |
| 4,987,656 A * | 1/1991 | Sato | ........................ | F16B 21/09 24/297 |
| 5,842,672 A * | 12/1998 | Sweere | .................. | A47B 21/00 248/278.1 |
| 6,033,019 A * | 3/2000 | Hession-Kunz | ....... | A47D 1/002 297/250.1 |
| 6,289,560 B1 * | 9/2001 | Guyot | ..................... | F16B 5/065 24/297 |
| 6,409,127 B1 * | 6/2002 | VanderHeide | ..... | A47B 21/0314 108/93 |
| 6,449,814 B1 * | 9/2002 | Dinsmore | ............... | F16B 5/065 24/289 |
| 6,450,467 B2 * | 9/2002 | Timm | ................. | A47B 21/0314 108/69 |
| 6,510,049 B2 * | 1/2003 | Rosen | .................. | F16M 11/105 248/919 |
| 7,028,961 B1 * | 4/2006 | Dittmer | .................. | F16M 11/04 248/278.1 |
| 7,048,242 B2 * | 5/2006 | Oddsen, Jr. | ............ | F16M 11/04 248/279.1 |
| 7,395,996 B2 * | 7/2008 | Dittmer | .................. | F16M 11/04 248/291.1 |
| 7,487,943 B1 * | 2/2009 | Gillespie | ................ | F16M 11/04 248/279.1 |
| 7,490,804 B2 * | 2/2009 | Oh | ........................ | F16M 11/10 248/278.1 |
| 7,543,985 B2 * | 6/2009 | Chapman | ............ | A61B 6/4429 378/181 |
| 7,641,163 B2 * | 1/2010 | O'Keene | ............... | F16M 11/10 248/284.1 |
| 7,717,375 B2 * | 5/2010 | Chen | ..................... | F21V 21/26 248/125.7 |
| 7,726,617 B2 * | 6/2010 | Zambelli | ................ | F16M 11/04 248/222.12 |
| 7,823,847 B2 * | 11/2010 | Bremmon | .............. | F16M 11/10 248/201 |
| 7,857,270 B2 * | 12/2010 | Short | ..................... | F16M 11/10 248/284.1 |
| 7,891,622 B1 * | 2/2011 | O'Keene | ............... | F16M 11/10 16/358 |
| 8,072,739 B2 * | 12/2011 | Dittmer | .................. | F16M 11/10 248/184.1 |
| 8,456,808 B2 * | 6/2013 | Grey | ...................... | F16M 11/10 248/201 |
| 2002/0011544 A1 * | 1/2002 | Bosson | .................. | F16M 11/04 248/121 |
| 2002/0197107 A1 * | 12/2002 | Granata | ............. | B60R 13/0206 403/381 |
| 2004/0011932 A1 * | 1/2004 | Duff | ....................... | F16M 11/08 248/157 |
| 2004/0011938 A1 * | 1/2004 | Oddsen, Jr. | ............ | F16M 11/04 248/393 |
| 2004/0245420 A1 * | 12/2004 | Pfister | .................. | F16C 11/103 248/289.11 |
| 2005/0092873 A1 * | 5/2005 | Lin | ........................ | F16M 11/08 248/125.9 |
| 2005/0121577 A1 * | 6/2005 | Oddsen, Jr. | ............ | F16M 11/04 248/225.11 |
| 2006/0272154 A1 * | 12/2006 | Brevard | ............... | B26B 21/446 30/41 |
| 2006/0291152 A1 * | 12/2006 | Bremmon | .............. | F16M 11/10 361/679.06 |
| 2009/0200532 A1 * | 8/2009 | Platt | .................... | E04F 11/1834 256/67 |

* cited by examiner

ARCUATE CLIP ASSEMBLY

RELATED APPLICATIONS

The present application is a National Phase of International Application Number PCT/US2013/035362 filed Apr. 5, 2013 and relates to and claims priority benefits from U.S. Provisional Patent Application No. 61/621,732 filed Apr. 9, 2012, which is hereby incorporated by reference in its entirety.

FIELD OF EMBODIMENTS OF THE DISCLOSURE

Embodiments of the present disclosure generally relate to a clip assembly configured to secure multiple structural components together, and, more particularly, to a clip assembly that may connect structural components together through various points along an arcuate sweep angle.

BACKGROUND

During the manufacturing process of a vehicle, various components are connected together to form structures and sub-structures. For example, doors are connected to a main vehicle frame, tail lights are secured to the frame, and the like. Many vehicles are distinctly designed and styled to be different than other vehicles. Accordingly, the distinct vehicle styles, shapes, geometries, and the like often require customized fastening assemblies. As an example, particular vehicle designs may use a fastening member that secures to another fastening member at an angle, while another vehicle design may use a different fastening member that secures to another fastening member at a different angle. Typically, separate and distinct fastening assemblies, such as sheet metal clips or grommets, are designed having unique angular features. However, the manufacture and use of customized fastening assemblies for each individual vehicle style increases manufacturing costs.

SUMMARY OF EMBODIMENTS OF THE DISCLOSURE

Embodiments of the present disclosure provide a clip assembly that may be used with respect to various attachment angles, thereby providing a common clip assembly that may be used with a wide variety of structural designs, shapes, and geometries. For example, embodiments of the present disclosure provide a clip assembly that may be used with various distinct styles of vehicles.

Certain embodiments of the present disclosure provide a clip assembly configured to securely connect a first structural component to a second structural component. The clip assembly may include an arc attachment member and an arc-receiving member. The arc attachment member may include a securing arc having a semi-circular rim. The arc attachment member is configured to be secured to one of the first or second structural components. The arc-receiving member may include an arc-receiving portion configured to receive the securing arc through multiple directions. The arc-receiving member is configured to be secured to the other of the first or second structural components. The securing arc is configured to be pivotally adjusted with respect to the arc-receiving portion.

The arc-receiving portion may include opposed arc-retaining members. Each of the opposed arc-retaining members may include an extension beam and an expanded head. An arc-receiving channel is defined between the opposed arc-retaining members. A portion of the securing arc is slidably retained within the arc-receiving channel.

The securing arc may also include an internal fin connected to the semi-circular rim. A thickness of the internal fin may be less than that of the semi-circular rim.

Each of the arc attachment member and the arc-receiving member may also include a panel-securing portion that is configured to securely connect to a portion of the first or second structural component. The panel-securing portion may include one or more of a connection stud, a recessed neck, connection beams, or a beveled tip. The panel-securing portion may be a component-securing portion that includes one or more securing wedges extending from a base. The securing wedges may be configured to selectively secure the arc-receiving member to an internal or outer portion of the first or second structural component. The arc-receiving portion of the arc-receiving member may also include one or more straps configured to conform to a shape of the rim.

Certain embodiments of the present disclosure provide a structural assembly that may include a first structural component, a second structural component, and a clip sub-assembly that adjustably connects the first structural component to the second structural component.

Certain embodiments of the present disclosure provide a clip assembly configured to securely connect a first structural component to a second structural component. The clip assembly may include an arc attachment member and an arc-receiving member. The arc attachment member may include a securing arc having a semi-circular rim connected to an internal fin, and a first panel-securing portion configured to securely connect to a portion of the first or second structural components. The arc-receiving member may include an arc-receiving portion configured to receive the securing arc through multiple directions, and a second panel-securing portion configured to securely connect to a portion of the other of the first or second structural components. The arc-receiving member is configured to be secured to the other of the first or second structural components. The securing arc is configured to be pivotally adjusted with respect to the arc-receiving portion.

One or both of the first or second panel-securing portions may include one or more of a connection stud, a recessed neck, connection beams, or a beveled tip. One or both of the first or second panel-securing portions may include one or more securing wedges extending from a base. The securing wedge(s) may be configured to selectively secure the arc-receiving member to an internal or outer portion of the first or second structural components.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Figure 1:
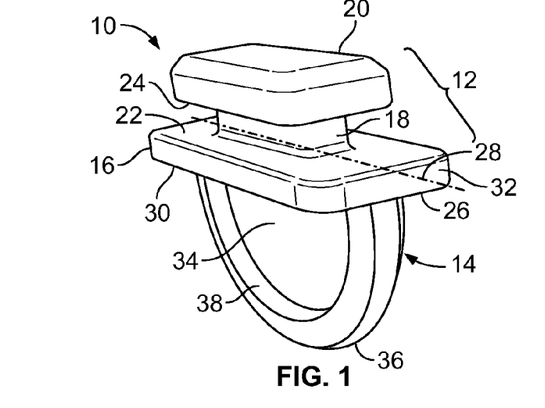
FIG. 1 illustrates an isometric top view of an arc attachment member, according to an embodiment of the present disclosure.
Figure 2:
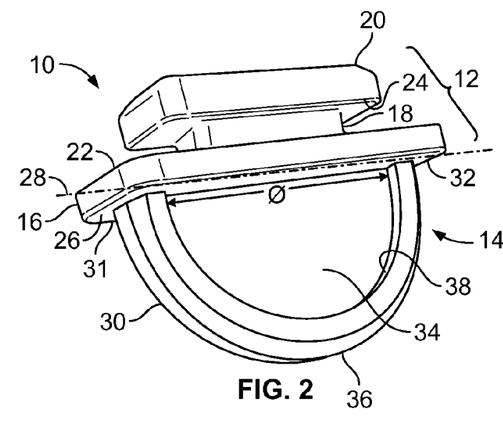
FIG. 2 illustrates an isometric front view of an arc attachment member, according to an embodiment of the present disclosure.

FIGS. 1 and 2 illustrate isometric top and front views, respectively, of an arc or first attachment member 10, according to an embodiment of the present disclosure. Referring to FIGS. 1 and 2, the arc attachment member 10 may be formed as a unitary piece of plastic or metal. For example, the arc attachment member 10 may be integrally molded and formed as a single piece of injection molded plastic.

The arc attachment member 10 includes a panel-securing portion 12 integrally connected to a securing arc 14. The panel-securing portion 12 includes a planar base 16 connected to a recessed neck 18, which, in turn, connects to a connection stud 20. The planar base 16 is wider and longer than the neck 18. Similarly, the connection stud 20 is wider and longer than the neck 18. A structural component, such as a panel or frame portion of a vehicle, is configured to be secured between the base 16 and the connection stud 20. For example, a panel may include an opening defined by internal edges. The neck 18 is configured to be positioned within the opening, such that the internal edges are sandwiched between an upper surface 22 of the base 16 and a lower surface 24 of the connection stud 20. As such, the panel-securing portion 12 may be configured to be snap fit to a structural component. While the base 16, the neck 18, and the connection stud 20 are generally shown as rectangular in shape, these components may be sized and shaped differently than shown. For example, one or more of the base 16, the neck 18, and the connection stud 20 may be circular in cross-section.

The securing arc 14 extends downwardly from a lower surface 26 of the base 16. The securing arc 14 may be centered about a longitudinal axis 28 of the arc attachment member 10, and has a center that may be aligned with a center of the arc attachment member 10. However, the securing arc 14 may be positioned at various other areas of the arc attachment member 10. For example, the securing arc 14 may be offset from the longitudinal axis 28, and/or asymmetrical with respect to a center of the arc attachment member 10.

The securing arc 14 includes a curved, arcuate, semi-circular rim 30 that extends through a sweeping arc from an area proximate a first end 31 of the planar base 16 to a second end 32 of the planar base 16. The rim 30 is integrally connected to an internal fin 34 that extends from internal areas of the rim 30 to the lower surface 26 of the base 16. The internal fin 34 is recessed with respect to the rim 30. For example, the thickness of the internal fin 34 is less than that of the rim 30. The rim 30 includes an exposed outer edge 36 and an internal ledge 38 that connects to the internal fin 34. The securing arc 14 extends through a radial angle $\theta$, which may be 180°, as shown in FIGS. 1 and 2. However, the angle $\theta$ may be greater or less than 180°.

Figure 3:
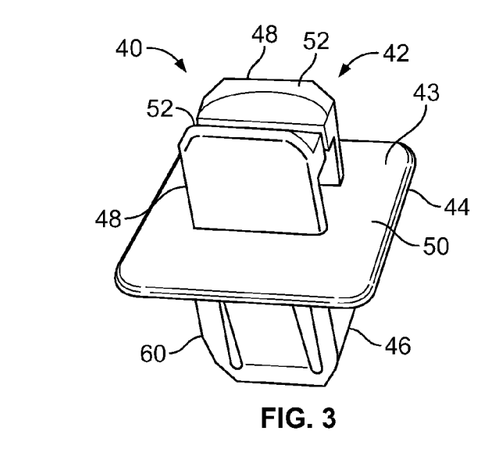
FIG. 3 illustrates an isometric top view of an arc-receiving member, according to an embodiment of the present disclosure.
Figure 4:
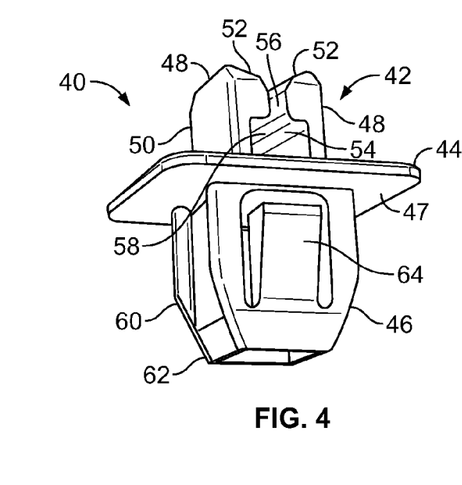
FIG. 4 illustrates an isometric front view of an arc-receiving member, according to an embodiment of the present disclosure.

FIGS. 3 and 4 illustrate isometric top and front views, respectively, of an arc-receiving or second attachment member 40, according to an embodiment of the present disclosure. Referring to FIGS. 3 and 4, the arc-receiving member 40 may be formed as a unitary piece of plastic or metal. For example, the arc-receiving member 40 may be integrally molded and formed as a single piece of injection molded plastic.

The arc-receiving member 40 includes an arc-receiving portion 42 extending from an upper surface 43 of a central collar 44, and a panel-securing portion 46 extending from a lower surface 47 of the central collar 44. The arc-receiving portion 42 includes opposed arc-retaining members 48, such as prongs, clips, clasps, latches, or the like. Each arc-retaining member 48 includes an upright beam 50 having a distal expanded head 52. An arc-receiving channel 54 is defined between the opposed arc-retaining members 48. The arc-receiving channel 54 includes a fin-retention space 56 defined between the expanded heads 52, and a rim-retention space 58 defined between areas below the expanded heads 52. The rim-retention space 58 is wider and larger than the fin-retention space 56 in order to accommodate the wider rim 30 (shown in FIGS. 1 and 2) of the securing arc 14.

The opposed arc-retaining members 48 are flexible and resilient. Thus, when the securing arc 14 is urged between the opposed arc-retaining members 48, the rim 30 spreads the opposed arc retaining members 48 apart, until the rim 30 is positioned within the rim-retention space 58, at which point, the opposed arc-retaining members 48 snap back, thereby trapping the rim 30 within the rim-retention space 58.

The panel-securing portion 46 includes a main body 60 having a beveled tip 62 and one or more resilient beams 64. The beveled tip 62 is configured to lead the panel-securing portion 46 into an opening formed through a structural component, such as a panel or frame portion of a vehicle. The resilient beams 64 are configured to snapably engage edge portions of the structural component in order to secure the arc-receiving member 40 to the structural component. However, the panel-securing portion 46 may include various other features and structures configured to secure to a component. For example, the panel-securing portion 46 may be similar to the panel-securing portion 12 (shown in FIG. 1) of the arc attachment member 10, or vice versa. Moreover, both members 10 and 40 may be configured to be secured to another structural component, such as a vehicle frame or panel, through various other connection devices and/or methods, such as separate and distinct fasteners, welding, bonding, or the like.

Figure 5:
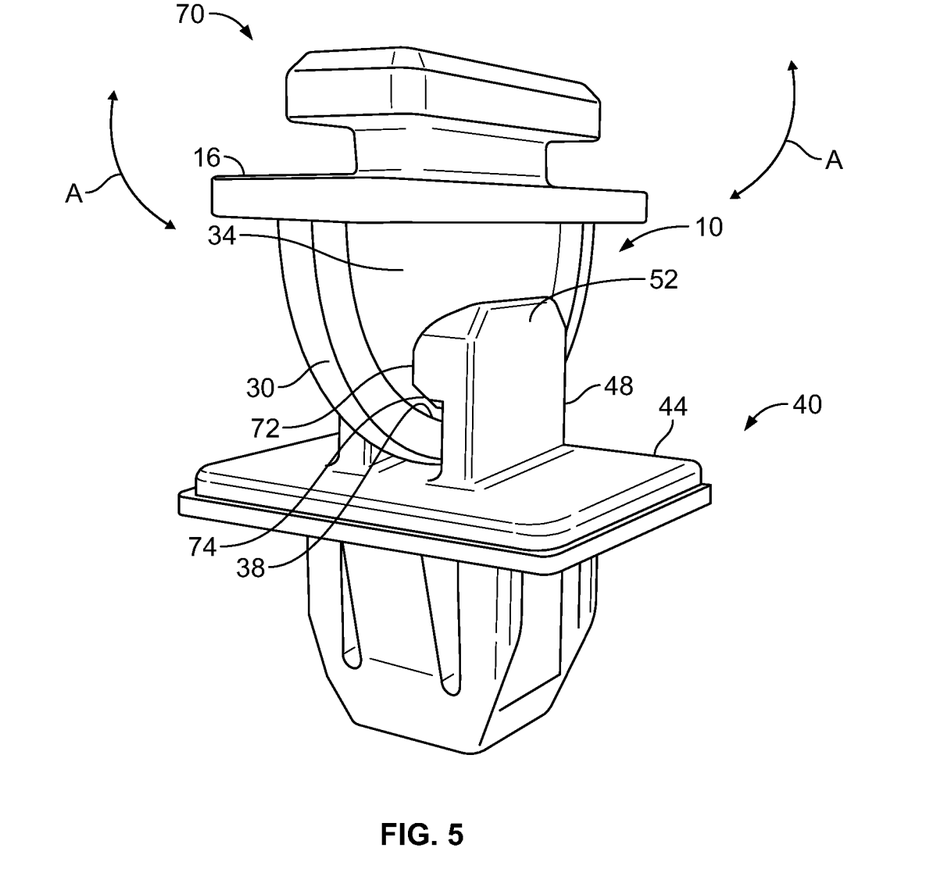
FIG. 5 illustrates an isometric view of an arcuate clip assembly, according to an embodiment of the present disclosure.
Figure 7:
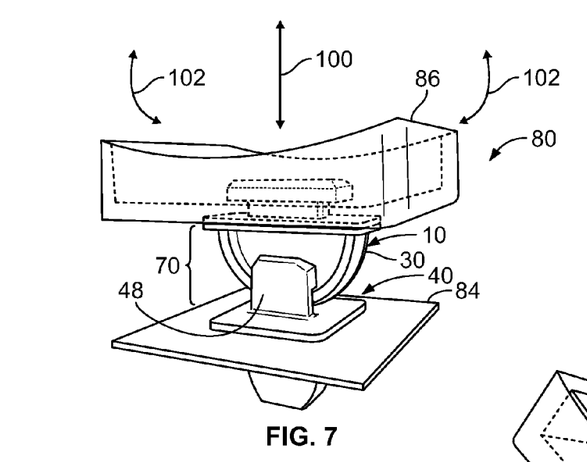
FIG. 7 illustrates an isometric view of a structural assembly in an upright orientation, according to an embodiment of the present disclosure.
Figure 8:
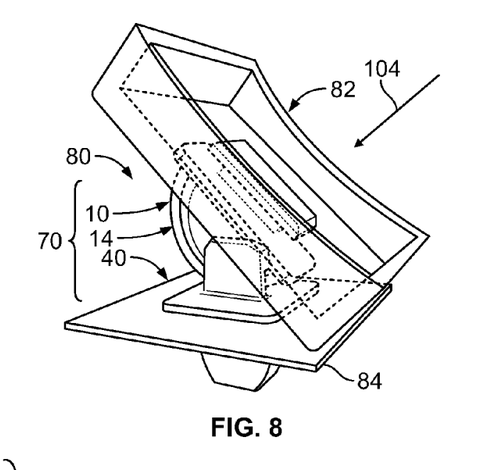
FIG. 8 illustrates an isometric view of a structural assembly in a first angled orientation, according an embodiment of the present disclosure.
Figure 9:
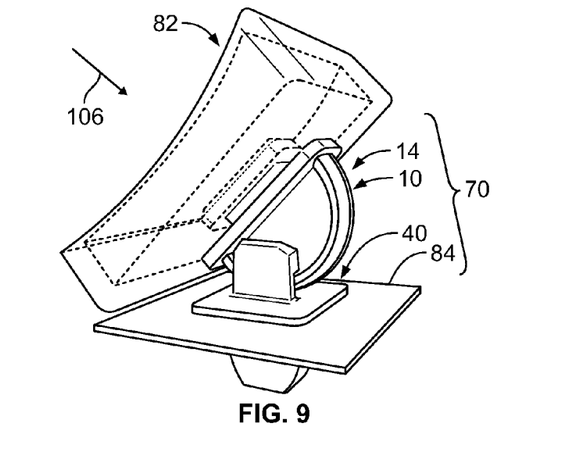
FIG. 9 illustrates an isometric view of a structural assembly in a second angled orientation, according to an embodiment of the present disclosure.

FIG. 5 illustrates an isometric view of an arcuate clip assembly 70, according to an embodiment of the present disclosure. The clip assembly 70 includes the arc attachment member 10 and the arc-receiving member 40. In order to connect the arc attachment member 10 to the arc-receiving member t0, the rim 30 of the arc attachment member 10 is aligned with the arc-receiving channel 54 (shown in FIG. 4) of the arc-receiving member 40. After alignment, the arc-attachment member 10 is urged toward the arc-receiving member 40, or vice versa. As the rim 30 engages the opposed arc-retaining members 48, the rim 30 spreads the opposed arc-retaining members 48 open, until the rim 30 is within the rim-retention space 58 (shown in FIG. 4). Consequently, the arc-retaining members 48 snap back to their at-rest positions, such that interior planar surfaces 72 of the expanded heads 52 abut into outer surfaces of the internal fin 34. In this position, the rim 30 is trapped within the rim-retention space 58 as the internal ledge 38 on each side of the rim 30 abuts into a lower flat retaining surface 74 of the expanded head 52 of the arc-retaining member 48. Therefore, the arc-retaining members 48 slidably retain the rim 30, so that the arc attachment member 10 may be pivotally adjusted with respect to the arc-receiving member 40 through directions denoted by arcs A. Moreover, because the rim 30 is arcuate, the arc-retaining members 48 may securely receive and slidably retain the rim 30 through various angles and directions. That is, the arc attachment member 10 may connect to the arc-receiving member 40 when the base 16 of the arc attachment member 10 is parallel or non-parallel to the collar 44 of the arc-receiving member 40, as shown in FIGS. 7-9, for example.

Figure 6:
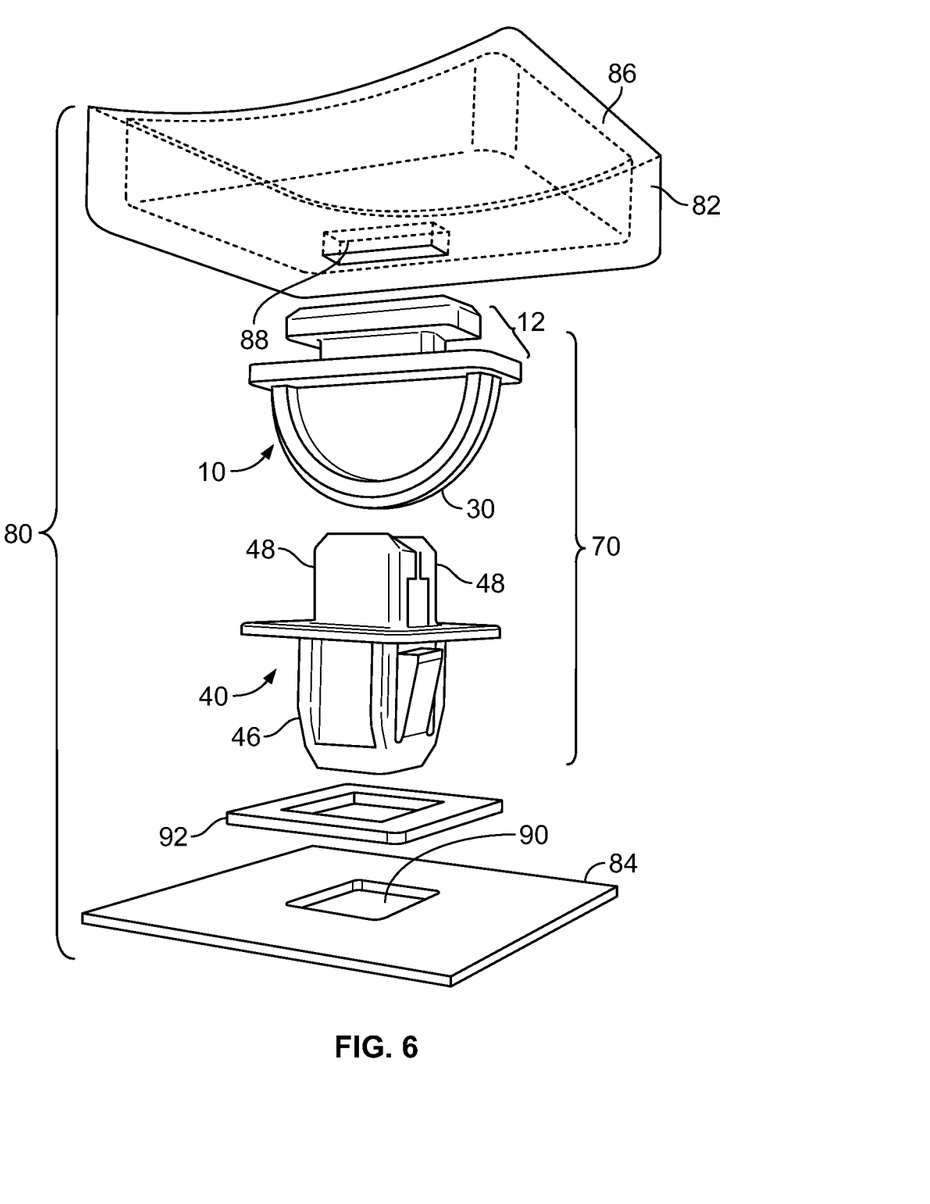
FIG. 6 illustrates an isometric exploded view of a structural assembly, according to an embodiment of the present disclosure.

FIG. 6 illustrates an isometric exploded view of a structural assembly 80, according to an embodiment of the present disclosure. The structural assembly 80 includes the arcuate clip assembly 70 connecting a first structural component 82, such as a tail lamp housing of a vehicle, to a second structural component 84, such as sheet metal of a frame of a vehicle. The first structural component 82 includes a main body 86 having an opening 88 formed therein. The opening 88 receives the panel-securing portion 12 of the arc attachment member 10. That is, the arc attachment member 10 secures to the first structural component 82 through the panel-securing portion 12 securely mating into the opening 88.

Similarly, the second structural component 84 may be a planar sheet having an opening 90 formed therethrough. The opening 90 is configured to receive and retain the panel-securing portion 46 of the arc-receiving member 40. For example, the panel-securing portion 46 may snapably secure into the opening 90. A sealing member 92, such as a gasket, may be positioned around the panel-securing portion 46 and sandwiched between the collar 44 and the second structural component 84.

Thus, the arc attachment member 10 secures to the first structural component 82, and the arc-receiving member 40 secures to the second structural component 84. In order to connect the first and second structural components 82 and 84, respectively, together, the rim 30 is urged into and secured between the arc-retaining members 48, as discussed above.

FIG. 7 illustrates an isometric view of the structural assembly 80 in an upright orientation, according to an embodiment of the present disclosure. As shown, the first structural component 82 is generally parallel with the second structural component 84. The arcuate clip assembly 70 is configured to allow the parallel structural components 82 and 84 to be secured to one another in a direction denoted by arrow 100. That is, the components 82 and 84 may be parallel with one another, and urged toward one another in the direction of arrow 100, and the arc attachment member 10 secures to the arc-receiving member 40, as described above, thereby securing the structural components 82 and 84 together. Once attached, the structural components 82 and 84 may be pivoted with respect to one another in the directions of arcs 102, by way of the rim 30 being slidably retained between the opposed arc-retaining members 48.

During installation, the arc attachment member 10 may be secured to the first structural component 82. For example, the arc attachment member 10 may be insert molded to or with the first structural component 82, or snapably secured thereto, or the like. In an embodiment, the arc attachment member 10 may be integrally molded and formed within the first structural component 82. The rim 30 of the arc attachment member 10 may then be pivotally secured to the arc-receiving member 40, as described above. Next, the second structural component 84 may be secured to the arc-receiving member 40, such as through a snap fit. Alternatively, the arc-receiving member 40 may be integrally formed with the second structural component 84, such as through injection molding. The first and second structural components 82 and 84 may be structures within a vehicle. For example, the first structural component 82 may be a head light or tail light housing, while the second structural component 84 may be an internal metal structural frame of the vehicle.

FIGS. 8 and 9 illustrate isometric views of the structural assembly 80 in first and second angled orientations, respectively, according an embodiment of the present disclosure. As shown in FIGS. 8 and 9, the first structural component 82 may be angled with respect to the second structural component 84. The arcuate clip assembly 70 allows the components 82 and 84 to be secured together at the angles shown and pivotally adjusted therebetween, due to the arcuate sweep of the securing arc 14. Further, due to the securing arc 14, the components 82 and 84 may be connected together through various securing directions other than from directly above or below. For example, the first structural component 82 may be urged toward the second structural component 84 into connection from directions 104, 106, or various other directions. The securing arc 14 provides a wide sweeping angle that allows the arc attachment member 10 to securely attach to the arc-receiving member 40 through various directions and orientations. Moreover, the arc attachment member 10 may be slidably pivoted with respect to the arc-receiving member 40 after connection, in order to provide a more tailored connection orientation between the structural components 82 and 84.

The arc-receiving member 40 is configured to receive and connect with the arc attachment member 10, and vice versa, through multiple directions, such as straight, linear vertical directions (or directions that are parallel or perpendicular to longitudinal or lateral axes of the members 10 and 40), angled directions (for example, directions that are not parallel to the longitudinal or lateral axes, and/or offset from directions that are normal to base surfaces of the members 10 and 40), and the like. For example, the arc-receiving member 40 and the arc attachment member 10 may connect together through directions other than vertical directions that are perpendicular to the planes of base, collar, or flange portions, as shown in FIGS. 8 and 9, for example.

Figure 10:
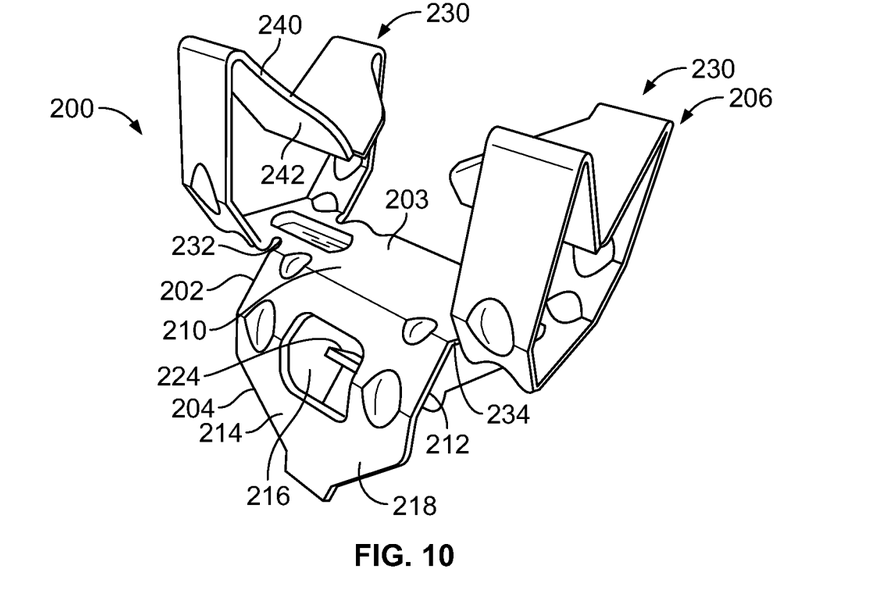
FIG. 10 illustrates an isometric top view of an arc-receiving member, according to an embodiment of the present disclosure.
Figure 11:
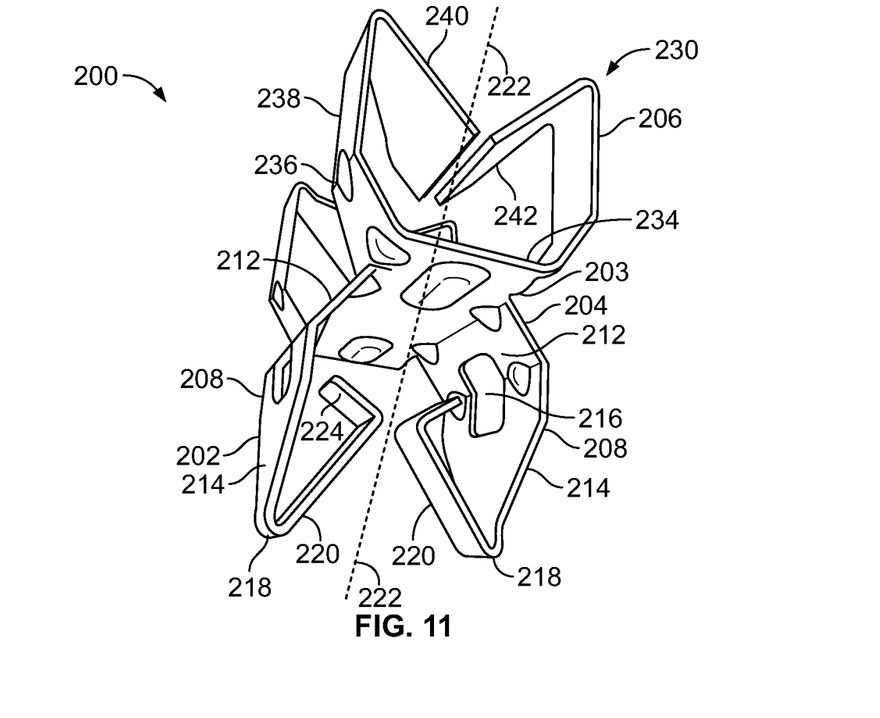
FIG. 11 illustrates an isometric bottom view of an arc-receiving member, according to an embodiment of the present disclosure.

FIGS. 10 and 11 illustrate isometric top and bottom views, respectively, of an arc-receiving or first attachment member 200, according to an embodiment of the present disclosure. The arc-receiving member 200 includes a main body 202 having an arc-receiving portion 204 extending downwardly from a planar base 203 and a component-securing portion 206 extending upwardly from the base 203.

The arc-receiving portion 204 includes opposed arc-retaining beams 208 that extend from lateral edges 210 of the base 203. Each arc-retaining beam 208 includes an angled strap 212 that extends downwardly and outwardly from the base 203. The angled strap 212 connects to an extension strap 214 that may generally be perpendicular to the base 203. An opening 216 may be formed through portions of one or both of the straps 212 and 214. The opening 216 may provide added flexibility and resiliency to the arc-retaining beam 208. Optionally, no opening may be formed through the arc-retaining beam 208.

An upturned fold 218 extends from a distal end of the extension strap 214. The upturned fold 218 connects to a linear strap 220 that angles inwardly and upwardly toward a central plane 222 of the arc-receiving member 200. A canted tab 224 extends from a distal end of the linear strap 220. The canted tab 224 may be generally perpendicular to the linear strap 220.

The component securing portion 206 may include securing wedges 230 extending upwardly from either end 232 and 234 of the base 203. Each securing wedge 230 may include an angled strap 236 that upwardly and outwardly extends from the base 203. The angled strap 236, in turn, connects to an upright extension strap 238, which, in turn, connects to an inwardly-directed strap 240 that bends down and toward the central plane 222. The strap 240 may include an expanded distal end 242 that extends toward the opposite end securing wedge 230.

The component securing portion 206 may include more or less securing wedges 230 than those shown. For example, instead of two securing wedges 230 at either end 232 and 234 of the base 203, the component securing portion 206 may include a single securing wedge 230 extending from a central portion of the base 203.

Figure 12:
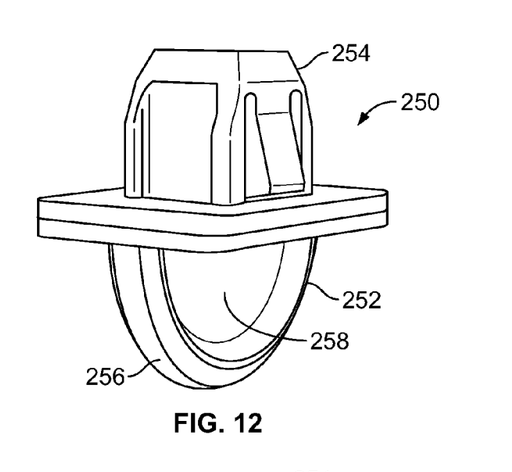
FIG. 12 illustrates an isometric front view of an arc attachment member, according to an embodiment of the present disclosure.
Figure 13:
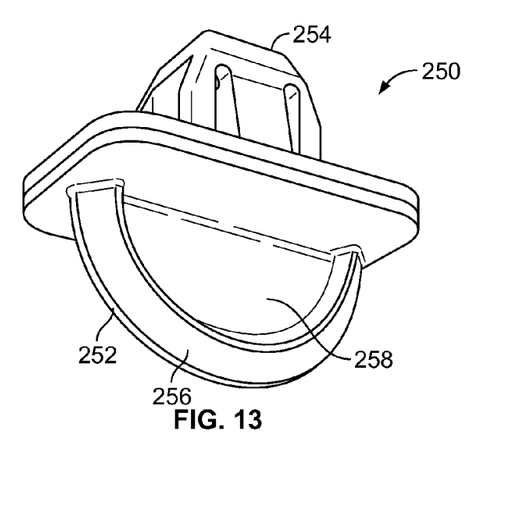
FIG. 13 illustrates an isometric bottom view of an arc attachment member, according to an embodiment of the present disclosure.

FIGS. 12 and 13 illustrate isometric front and bottom views, respectively, of an arc or second attachment member 250, according to an embodiment of the present disclosure. As described above, the arc attachment member 250 includes a securing arc 252 and a panel-securing portion 254, which may be similar to the panel securing arc 14 (shown in FIG. 1, for example), or the panel securing portion 46 (shown in FIG. 4, for example). The securing arc 252 includes a curved, semi-circular, arcuate rim 256 and internal fin 258, as described above.

Alternatively, instead of the panel-securing portion 254, the arc attachment member 250 may include a panel-securing portion like the component-securing portion 206 of the arc-receiving member 200, as shown in FIGS. 10 and 11.

Figure 14:
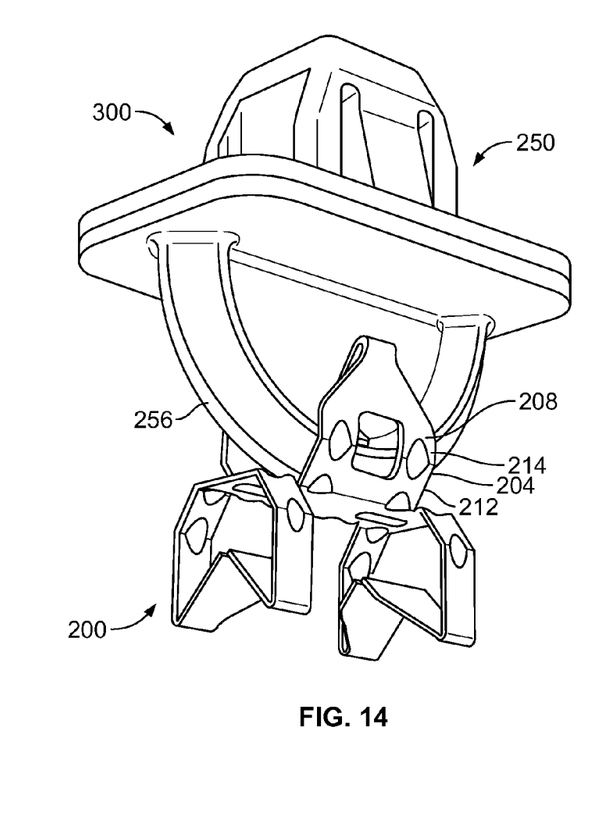
FIG. 14 illustrates an isometric view of a clip assembly, according to an embodiment of the present disclosure.

FIG. 14 illustrates an isometric view of a clip assembly 300, according to an embodiment of the present disclosure. The arc-receiving portion 204 receives and pivotally retains the rim 256 and internal fin 258 similar to as described above. When the arc attachment member 250 is urged between the opposed arc-retaining beams 208, the rim 256 forces the opposed beams 208 apart until the opposed canted tabs 224 (shown in FIGS. 10 and 11) are past the rim 256. Once past the rim 256, the opposed arc-retaining beams 208 flex back toward at-rest positions, thereby trapping the rim 256 underneath the tabs 224. The straps 212 and 214 may conform to the shape of outside of the rim 256, thereby providing a secure, slidable connection therebetween.

Figure 15:
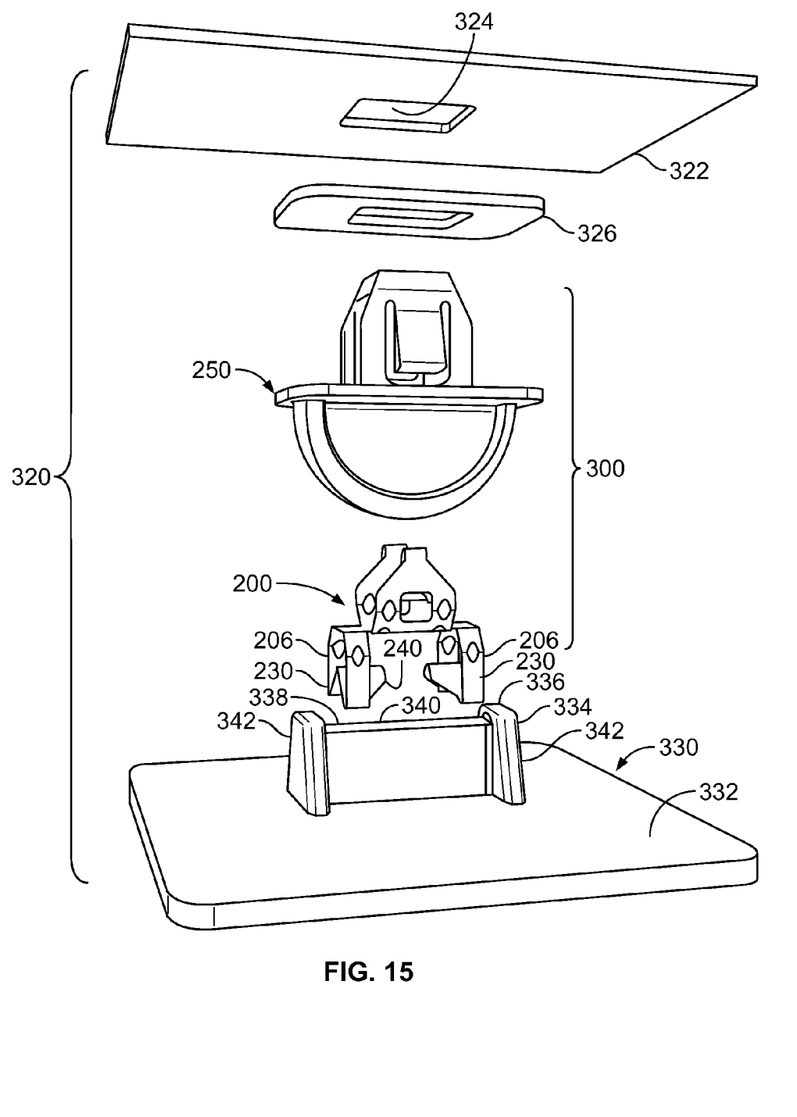
FIG. 15 illustrates an isometric exploded view of a structural assembly, according to an embodiment of the present disclosure.

FIG. 15 illustrates an isometric exploded view of a structural assembly 320, according to an embodiment of the present disclosure. The structural assembly 320 includes a first structural component 322 having an opening 324 configured to securely retain the panel-securing portion 254 of the arc attachment member 250. A sealing member 326 may be positioned around a portion of the panel-securing portion 254 and sandwiched between an underside of the first structural component 322 and a top surface of a base of the arc attachment member 250.

The structural assembly 320 may also include a second structural component 330 having a planar base 332. A connection protuberance 334 extends upwardly from the base 332. The connection protuberance 334 may include a vaulted housing 336 having lateral walls 338 that upwardly angle and connect at an apex or upper wall 340. The walls 338 may be positioned between end brackets 342. The securing wedges 230 are configured to compressively secure to the walls 338. For example, walls 338 may be pinched, wedged, clamped, or otherwise compressively secured between opposed straps 240 of each securing wedge 230.

As shown, the securing wedges 230 of the arc-securing member 200 may attach to outer surfaces of the housing 336. However, the securing wedges 230 may also secure to interior portions of the housing 336.

While not shown, the arc attachment member 250 may include a panel-securing portion like the component-securing portion 206 of the arc-receiving member 200. Accordingly, the arc attachment member 250 may also be secured to or within a housing extending from a panel, like that of the structural component 330.

Figure 16:
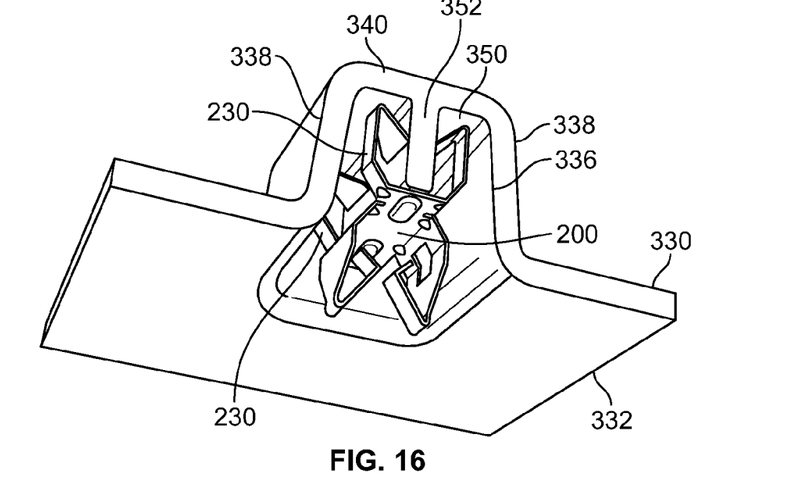
FIG. 16 illustrates an isometric internal view of an arc-receiving member secured to a housing of a structural component, according to an embodiment of the present disclosure.
Figure 17:
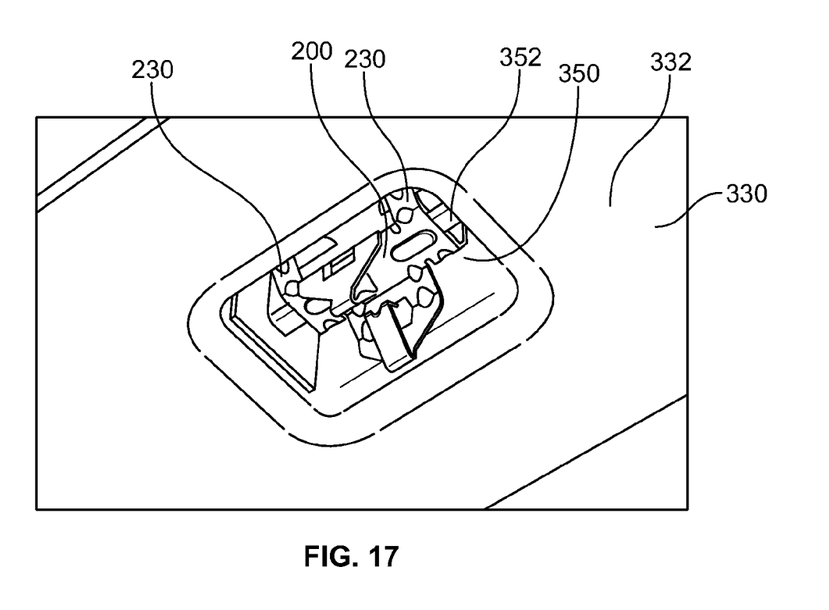
FIG. 17 illustrates an isometric bottom view of an arc-receiving member secured to a housing of a structural component, according to an embodiment of the present disclosure.

FIG. 16 illustrates an isometric internal view of an arc-receiving member 200 secured to the housing 336 of the structural component 330, according to an embodiment of the present disclosure. FIG. 17 illustrates an isometric bottom view of the arc-receiving member 200 secured to the housing 336 of the structural component 330. Referring to FIGS. 16 and 17, the housing 336 may define an internal, open-ended chamber 350 between the walls 338 and apex or upper wall 340. A central connection beam 352 may extend downwardly from the upper wall 340. The securing wedges 230 may securely connect to the connection beam 352 within the internal chamber 350. Accordingly, the arc-receiving member 200 may connect to an outside of the housing 336, as shown in FIG. 15, or the arc-receiving member 200 may be recessed within the housing 336, as shown in FIGS. 16 and 17.

Figure 18:
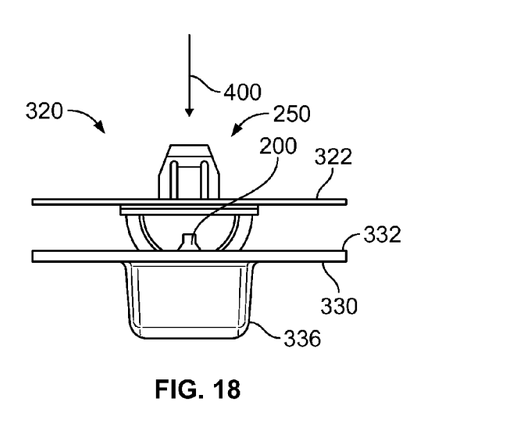
FIG. 18 illustrates a front view of a structural assembly having an arc attachment member secured to a recessed arc-receiving member in an upright position, according to an embodiment of the present disclosure.

FIG. 18 illustrates a front view of the structural assembly 320 having the arc attachment member 250 secured to a recessed arc-receiving member 200 in an upright position, according to an embodiment of the present disclosure. The arc-receiving member 200 may be secured to the structural component 330 within an internal chamber (shown in FIGS. 16 and 17) of the housing 336. The arc attachment member 250 may be urged into connection with the arc-receiving member 200 in a vertical direction denoted by arrow 400. The arc attachment member 250 may be pivotally adjusted with respect to the arc-receiving member 200 as described above.

Figure 19:
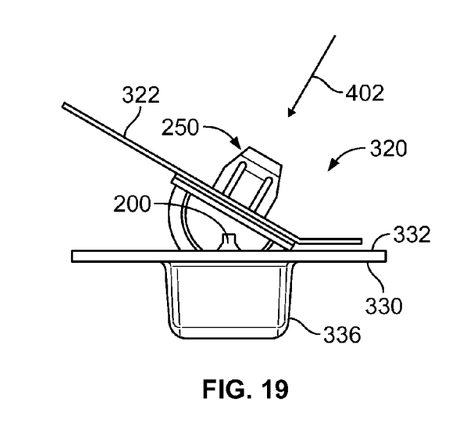
FIG. 19 illustrates a front view of a structural assembly having an arc attachment member secured to a recessed arc-receiving member in an angled position, according to an embodiment of the present disclosure.

FIG. 19 illustrates a front view of the structural assembly 320 having the arc attachment member 250 secured to the recessed arc-receiving member 200 in an angled position, according to an embodiment of the present disclosure. As described above, the arc attachment member 250 may be secured to arc-receiving member 402 in various directions other than vertical, such as through a direction denoted by arrow 402.

Figure 20:
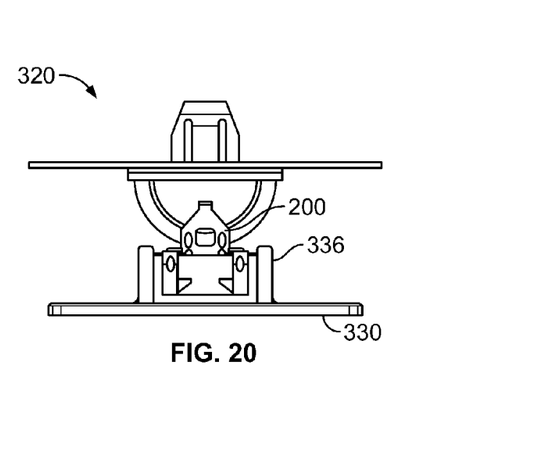
FIG. 20 illustrates a front view of a structural assembly having an arc attachment member secured to an exposed outer arc-receiving member in an upright position, according to an embodiment of the present disclosure.

FIG. 20 illustrates a front view of the structural assembly 320 having the arc attachment member 250 secured to the exposed outer arc-receiving member 200 in an upright position, according to an embodiment of the present disclosure. As shown in FIG. 20, the arc-receiving member 200 may connect to an outside of the housing 336.

Figure 21:
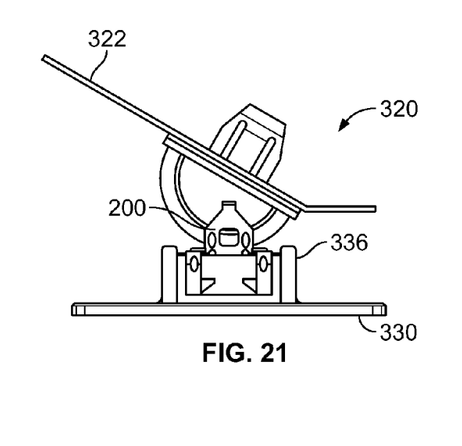
FIG. 21 illustrates a front view of a structural assembly having an arc attachment member secured to an exposed outer arc-receiving member in an angled position, according to an embodiment of the present disclosure.

FIG. 21 illustrates a front view of the structural assembly 320 having the arc attachment member 250 secured to the exposed outer arc-receiving member 200 in an angled position, according to an embodiment of the present disclosure. As described above, the arc attachment member 250 may be connected to the arc-receiving member 200 through various directions and angles. Moreover, the arc attachment member 250 may be pivotally adjusted with respect to the arc-receiving member 200 through a wide range of radial angles.

Referring to FIGS. 18-21, the arc-receiving member 200 may be selectively secured to an internal or outer portion of the second structural component 330. The securing wedges 230 are configured to securely attach to outer portions of walls of the housing 336, or the internal beam within internal chamber of the housing 336.

Referring to FIGS. 1-21, embodiments of the present disclosure provide clip assemblies that may be used with a wide variety of components, even if the components have unique geometries that would otherwise preclude the use of standard, straight-line fasteners. Embodiments of the present disclosure provide interchangeable clip assemblies that may be adapted and tailored for use with numerous distinctly shaped structural components. The clip assemblies may be adjusted, such as through pivotal movement, to provide a tailored, customized fit for various applications using the same arc attachment and arc-receiving members.

Embodiments of the present disclosure provide clip assemblies having angular variation tolerances over arcuate sweep angles. For example, the angular variation tolerance may be +/−45°, although the angular variation may be over smaller or larger arcuate sweep angles. Embodiments of the present disclosure provide clip assemblies that may be connected together in a straight, linear, or axial direction, or at various angles. The clip assemblies may be secured to components and one another through simple tooling and manufacturing processes.

Embodiments of the present disclosure provide clip assemblies that may be used with respect to various attachment angles, thereby providing a common clip assembly that may be used with a wide variety of structural designs, shapes, and geometries.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

Various features of the disclosure are set forth in the following claims.

The invention claimed is:

1. A clip assembly configured to securely connect a first structural component to a second structural component, the clip assembly comprising:
   an arc attachment member including: (a) a base, (b) a securing arc having a semi-circular rim extending from a lower surface of the base, wherein the semi-circular rim directly connects to first and second ends of the base at the lower surface, and (c) an internal fin integrally connected to and extending from an internal ledge of the semi-circular rim to the lower surface of the base between the first and second ends, wherein the internal fin is recessed with respect to the semi-circular rim, wherein the internal fin has a length extending between the first and second ends of the base, a height extending between the lower surface of the base to the internal ledge of the semi-circular rim, and a thickness extending between a first side of the internal fin to an opposite second side of the internal fin, wherein the thickness of the internal fin is less than a respective thickness of the semi-circular rim, wherein the arc attachment member is configured to be secured to one of the first or second structural components; and
   an arc-receiving member including an arc-receiving portion configured to receive the securing arc through multiple directions, wherein the arc-receiving member is configured to be secured to the other of the first or second structural components, and wherein the securing arc is configured to be pivotally adjusted with respect to the arc-receiving portion.

2. The clip assembly of claim 1, wherein the arc-receiving portion comprises opposed arc-retaining members, wherein each of the opposed arc-retaining members comprises an extension beam and an expanded head, wherein an arc-receiving channel is defined between the opposed arc-retaining members, and wherein a portion of the securing arc is slidably retained within the arc-receiving channel.

3. The clip assembly of claim 1, wherein each of the arc attachment member and the arc-receiving member further comprises a panel-securing portion, wherein the panel-securing portion of each of the arc member and the arc-receiving member is configured to securely connect to a portion of the first component or the second structural component.

4. The clip assembly of claim 3, wherein the panel-securing portion of at least one of the arc member and the arc-receiving member comprises one or more of a connection stud, a recessed neck, connection beams, or a beveled tip.

5. The clip assembly of claim 3, wherein the panel-securing portion comprises one or more securing wedges extending from a base.

6. The clip assembly of claim 5, wherein the one or more securing wedges are configured to selectively secure the arc-receiving member to an internal or outer portion of the first or second structural component.

7. The clip assembly of claim 1, wherein the arc-receiving portion of the arc-receiving member further comprises one or more straps configured to conform to a shape of the rim.

8. The clip assembly of claim 1, wherein the semi-circular rim extends through a sweeping arc of 180 degrees from the first end of the base to the second end of the base.

9. A structural assembly comprising:
a first structural component;
a second structural component; and
a clip sub-assembly that adjustably connects the first structural component to the second structural component, the clip sub-assembly comprising:
an arc attachment member including: (a) a base, (b) a securing arc having a semi-circular rim extending from a lower surface of the base, wherein the semi-circular rim directly connects to first and second ends of the base at the lower surface, and (c) an internal fin integrally connected to and extending from an internal ledge of the semi-circular rim to the lower surface of the base between the first and second ends, wherein the internal fin is recessed with respect to the semi-circular rim, wherein the internal fin has a length extending between the first and second ends of the base, a height extending between the lower surface of the base to the internal ledge of the semi-circular rim, and a thickness extending between a first side of the internal fin to an opposite second side of the internal fin, wherein the thickness of the internal fin is less than a respective thickness of the semi-circular rim, wherein the arc attachment member is secured to the first structural component; and
an arc-receiving member including an arc-receiving portion configured to receive the securing arc through multiple directions, wherein the arc-receiving member is secured to the second structural component, and wherein the securing arc is configured to be pivotally adjusted with respect to the arc-receiving portion in order to adjustably connect the first structural component to the second structural component.

10. The structural assembly of claim 9, wherein the arc-receiving portion comprises opposed arc-retaining members, wherein each of the opposed arc-retaining members comprises an extension beam and an expanded head, wherein an arc-receiving channel is defined between the opposed arc-retaining members, and wherein a portion of the securing arc is slidably retained within the arc-receiving channel.

11. The structural assembly of claim 9, wherein each of the arc attachment member and the arc-receiving member further comprises a panel-securing portion configured to securely connect to a portion of the first or second structural component.

12. The structural assembly of claim 11, wherein the panel-securing portion of at least one of the arc attachment member and the arc-receiving member comprises one or more of a connection stud, a recessed neck, connection beams, or a beveled tip.

13. The structural assembly of claim 11, wherein the panel-securing portion of at least one of the arc attachment member and the arc-receiving member comprises one or more securing wedges extending from a base.

14. The structural assembly of claim 13, wherein the one or more securing wedges are configured to selectively secure the arc-receiving member to an internal or outer portion of the first or second structural component.

15. The structural assembly of claim 9, wherein the arc-receiving portion of the arc-receiving member further comprises one or more straps configured to conform to a shape of the rim.

16. The structural assembly of claim 9, wherein the semi-circular rim extends through a sweeping arc of 180 degrees from the first end of the base to the second end of the base.

17. A clip assembly configured to securely connect a first structural component to a second structural component, the clip assembly comprising:
an arc attachment member including: (a) a base, (b) a securing arc having a semi-circular rim extending from a lower surface of the base, wherein the semi-circular rim directly connects to first and second ends of the base at the lower surface, wherein the semi-circular rim extends through a sweeping arc of 180 degrees from the first end of the base to the second end of the base, and (c) an internal fin integrally connected to and extending from an internal ledge of the semi-circular rim to the lower surface of the base between the first and second ends, wherein the internal fin is recessed with respect to the semi-circular rim, wherein the internal fin has a length extending between the first and second ends of the base, a height extending between the lower surface of the base to the internal ledge of the semi-circular rim, and a thickness extending between a first side of the internal fin to an opposite second side of the internal fin, and (d) a first panel-securing portion configured to securely connect to a portion of one of the first or second structural components, wherein the thickness of the internal fin is less than a respective thickness of the semi-circular rim; and
an arc-receiving member including an arc-receiving portion configured to receive the securing arc through multiple directions, and a second panel-securing portion configured to securely connect to a portion of the other of the first or second structural components, wherein the arc-receiving member is configured to be secured to the other of the first or second structural components, and wherein the securing arc is configured to be pivotally adjusted with respect to the arc-receiving portion.

18. The clip assembly of claim 17, wherein one or both of the first or second panel-securing portions comprises one or more of a connection stud, a recessed neck, connection beams, or a beveled tip.

19. The clip assembly of claim 17, wherein one or both of the first or second panel-securing portions comprises one or more securing wedges extending from a base.

20. The clip assembly of claim 19, wherein the one or more securing wedges are configured to selectively secure the arc-receiving member to an internal or outer portion of the first or second structural components.

* * * * *